United States Patent [19]

Tamamura

[11] Patent Number: 4,482,226
[45] Date of Patent: Nov. 13, 1984

[54] WINDING AND REWINDING DEVICE FOR CAMERA

[75] Inventor: Hideo Tamamura, Tokyo, Japan
[73] Assignee: Canon Kabushiki Kaisha
[21] Appl. No.: 411,355
[22] Filed: Aug. 25, 1982
[30] Foreign Application Priority Data

Sep. 2, 1981 [JP] Japan .................. 56-138148
Sep. 2, 1981 [JP] Japan .................. 56-138149

[51] Int. Cl.³ .............................................. G03D 1/04
[52] U.S. Cl. ................................. 354/173.1; 354/214; 242/71.6
[58] Field of Search .............. 354/171, 173.1, 212, 354/214; 242/71.6

[56] References Cited

U.S. PATENT DOCUMENTS 4,171,893 10/1979 Kawazoe .................. 354/214
4,239,166 12/1980 Daitoku .................... 242/71.6
4,371,244 2/1983 Daitoku et al. ............ 354/214

FOREIGN PATENT DOCUMENTS 1237427 3/1967 Fed. Rep. of Germany ...... 354/214

Primary Examiner—A. A. Mathews
Attorney, Agent, or Firm—Toren, McGeady and Stanger

[57] ABSTRACT

A drive gear is arranged to rotate in response to driving torque from an electric motor, and is supported for swinging movement by a shaft the axis of which is different from the axis of rotation of the drive gear. Also, the drive gear is urged by a bias force in a direction for release from meshing engagement with a transmission gear of a film rewinding system. When rewinding of a film is completed, and a load which is exerted on the film rewinding system during rewinding disappears, the meshing force between the drive gear and the transmission gear is reduced. The reduction in the meshing force effects an automatic release of the drive gear from the meshing engagement with the transmission gear.

11 Claims, 8 Drawing Figures

WINDING AND REWINDING DEVICE FOR CAMERA

BACKGROUND OF THE INVENTION

1. Field of the Invention

This invention relates to motorized film winding and rewinding devices for cameras, and more particularly to such device in which when rewinding of film is completed, the rewinding operation is automatically stopped.

2. Description of the Prior Art

In cameras in which winding up and rewinding of a film are carried out by an electric motor, in order that the electric motor be put into action to rewind the film it is the general practice that a control knob is operated to change over from the winding to the rewinding mode. Upon doing this, a rewinding operation is initiated. In such cameras, to terminate the rewinding operation, according to the prior art, the operator had to change over the aforesaid control knob to the winding mode again. That is, only when the operator is holding the control knob in the rewinding position, the electric motor acts to allow for rewinding of film. Then, when he removes his finger from pushing the control knob, this knob returns to the winding position where the motor is no longer energized. Alternatively, when the operator has moved the control knob to the rewinding position, the control knob is locked in that position, permitting the rewinding operation to continue going on by itself. Then, when the operator releases the control knob from the locking connection, the rewinding operation is terminated. With such conventional arrangements, however, as regards the former, the operator is obliged to sustain the depression of the control knob in the rewinding position for all the period of rewinding operation, thus suffering pain in his finger. Also in the latter case, when stopping the rewinding, the operator needs to take off the locking connection. Therefore, the operator must always take care in the progression of film rewinding, or it would result that even after all film has been rewound into the cartridge, the motor is still energized, causing premature consumption of the battery or heating of the camera. Further, such rewinding devices have an additional drawback that in order to inform the operator of when the rewinding of film comes to end, the complexity of camera structure has to be increased because it is required that the film counter be reversely rotated when the film is being rewound.

Figure 1:
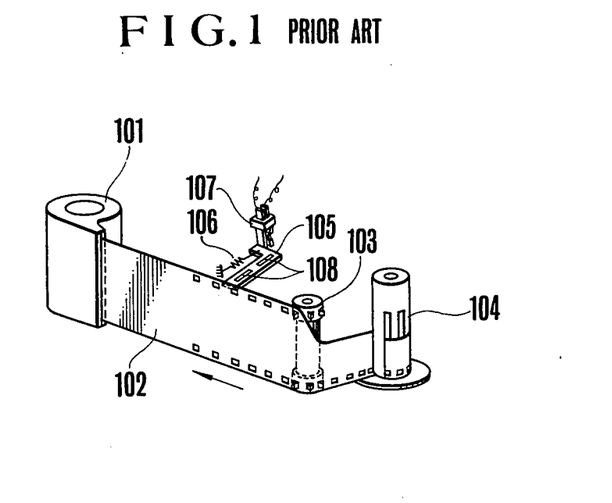
FIGS. 1 and 2 are perspective views illustrating an example of the prior art auto-stoppable rewinding device for a camera.
Figure 2:
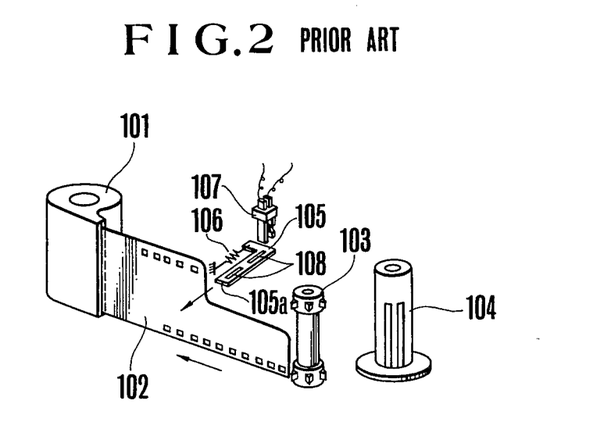
Figure 3:
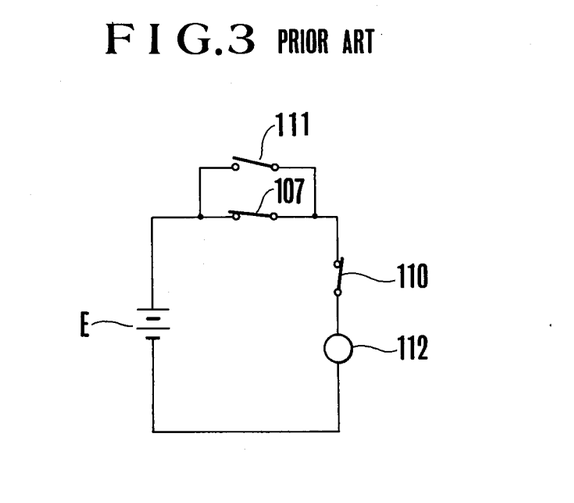
FIG. 3 is an electrical circuit diagram of a motor energization control circuit used in the device of FIGS. 1 and 2.

Attempts have been made to eliminate the abovedescribed drawbacks of such rewinding device by using a sensing member arranged upon setting of the rewinding mode to operate when the end of the film leader moves away from the takeup spool, or the root of the film tongue reaches the center of the length of the exposure aperture, so that the current supply to the motor is stopped, as illustrated in FIGS. 1 to 3. That is, this device is constructed with a cartridge 101 containing a film 102; sprocket 103; and a spool 104. And, the sensing member 105 is slidingly movable as it is guided by pins 108, and is urged by a spring 106 to abut with its end on the film 102. Positioned adjacent this sensing member 105 is a switch 107. In operating this device, when the film 102 reaches the position of FIG. 2, the sensing member 105 is allowed to slide in the direction of the arrow, wherein the switch 107 is turned off. Therefore, as illustrated in FIG. 3, the current supply to the motor 112 is cut off. Thus, motion of the motor is automatically stopped when the film has been rewound into the cartridge 101, leaving at least the film leader outside of the cartridge 101, and the film rewinding operation is also terminated. FIG. 3 shows an electrical power source or battery E; a switch 110 for controlling the current supply to the electric motor 112 when in the winding mode; and a switch 111 rendering it possible to supply current to the electric motor 112 when the back cover of the camera is open, or when the camera is not loaded with a film 112. However, such device has the following drawbacks. That is, since the sensing member is always pressed on the film surface, the flatness of the film is deteriorated badly. Also, since the sensing member is in frictional contact with the film when in the winding mode as well as in the rewinding mode, an increased load is laid on the electric motor. Further if this device were provided with no switches besides the switch cooperative with the sensing member, it would become impossible to supply current to the motor. Therefore, an additional switch which is closed when the back cover is open must be used as arranged in parallel with the sensing member switch. This calls for an increase in the complexity of the circuitry of the camera.

Also, to eliminate the drawbacks of such conventional device, upon consideration of the fact that the load which has been exerted on the film rewinding system as the film was being rewound lessens when the rewinding is completed, a device responsive to this lessening of the load for automatically stopping the rewinding operation has been proposed in U.S. Pat. No. 4,171,893 (issued Oct. 23, 1979). However, this device, because of its having such form that the drive gear rotating in response to driving torque transmitted from the motor is movable along its shaft of rotation to allow for release from the meshing engagement with a driven gear constituting part of a film rewinding system, is bound to employ expensive helical gears in coaxial relation to the drive gear. Otherwise, the drive gear could not be maintained in meshing engagement with the driven gear by the load exerted on the film rewinding system as the film is being rewound. That is, such device necessitates at least two helical gears which account for the increase in the production cost of the device.

Also in such device, while the helical gears are left engaged with each other, the control knob is operated to change over to the rewinding mode from the winding mode, so that the operator is given an unpleasant impression from the control knob. Further, to allow for movement of the drive gear along its shaft of rotation, the height of the camera must be disadvantageously increased from the value required for minimization of the bulk and size of the camera.

SUMMARY OF THE INVENTION

With the foregoing in mind, it is an object of the present invention to provide a winding and rewinding device for a camera which eliminates all the abovedescribed drawbacks of the conventional device, and which is capable of stopping the rewinding operation in automatic response to completion of the rewinding of the film.

This and other objects of the present invention will become apparent from the following description of an embodiment thereof.

DETAILED DESCRIPTION OF THE PREFERRED EMBODIMENT

The present invention will next be described in connection with an embodiment thereof by reference to the drawings.

Figure 4:
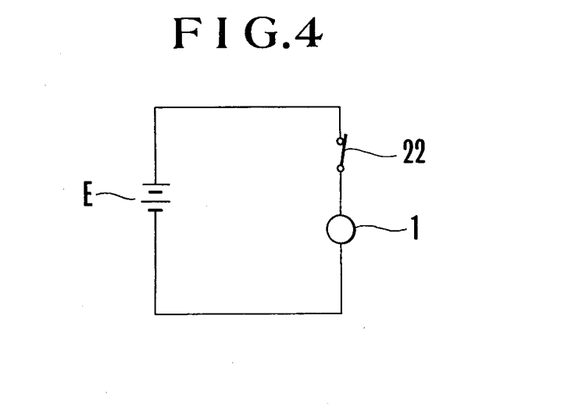
FIG. 4 is a similar diagram to FIG. 3 except that a motor energization control circuit in an embodiment of the invention is illustrated.
Figure 5:
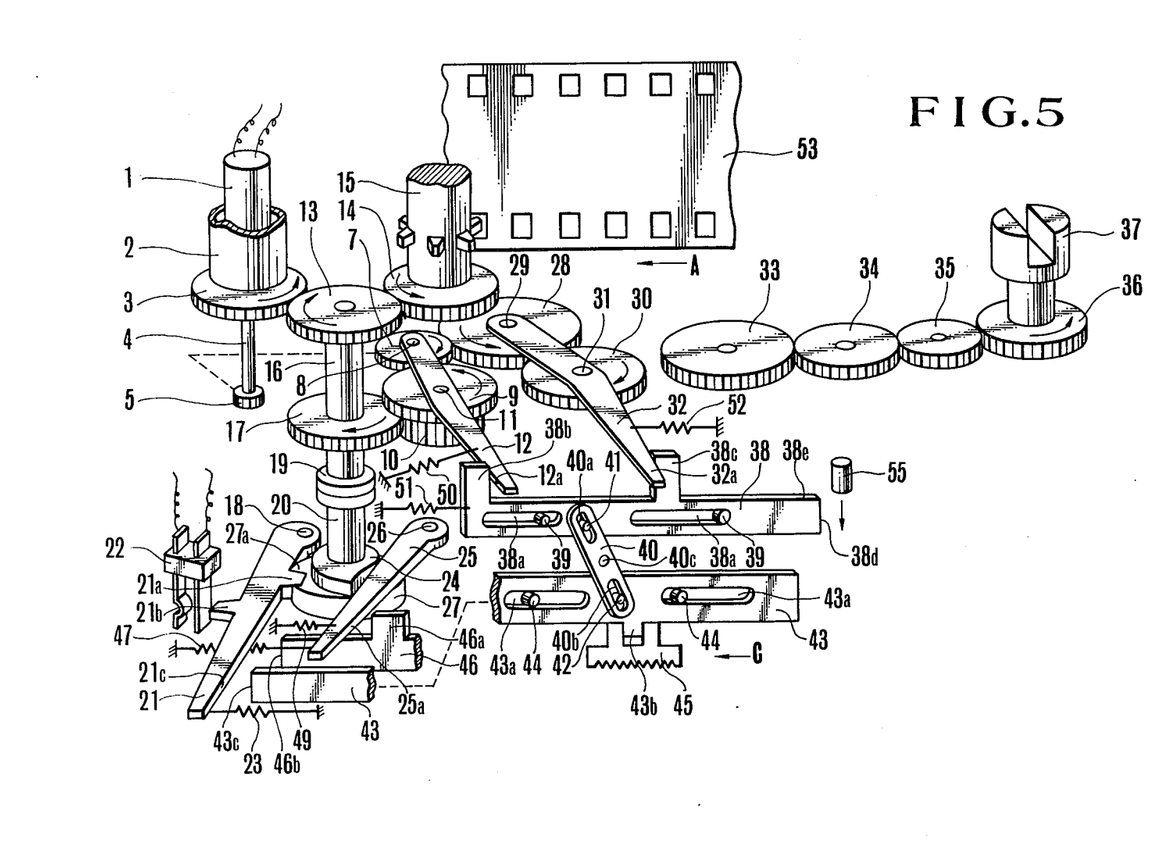
FIG. 5 is a perspective view of an embodiment of a winding and rewinding device for a camera according to the present invention, with the camera set in the winding-up mode.

FIG. 4 illustrates a drive circuit for a motor 1 in an embodiment of the present invention, including an electrical power source or battery E; and a switch 22 cooperating with a winding stop lever 21 to be described later. FIG. 5 in a perspective view illustrates an embodiment of the present invention, including a motor 1 as a drive source for winding up or rewinding a film 53 as has been described above; a spool 2; a gear 3 for driving the spool 2, the gear 3 being connected to the spool 2 by friction; an output shaft 4 of the motor 1 fixedly carrying a pinion 5 at the free end thereof, the pinion 5 meshing with a gear 7 which is rotatably supported on a shaft 8 supported on a camera housing (not shown) and which meshes with gears 9 and 28; and a gear 10 rotating as a unit with the gear 9, these gears 9 and 10 constituting a two-stage gear rotatably mounted on a shaft supported on a swinging lever 12 which is pivotally mounted on the shaft 8. A spring 50 urges the swinging lever 12 in a clockwise direction. A gear 17 meshes with the gear 10 and is fixed to a rotary shaft 16, the upper end of which fixedly carries a gear 13. The gear 13 meshes with the gear 3 and another gear 14, driving through the gear 3 to rotate the spool 2 and through the gear 14 to rotate a sprocket 15 in the same direction. A one-way clutch 19 of known construction transmits rotational motion of the rotary shaft 16 to a rotary shaft 20 only when the rotary shaft 16 rotates in a clockwise direction (indicated by arrow). A charge cam 24 and a winding stop cam 27 are both rotatable as a unit with the rotary shaft 20. A charge lever 25 is pivotally mounted on a pin 25, and urged by a spring 49 in a clockwise direction to abut on the charge cam 24. The charge lever 25 is arranged with its side edge 25a to be engageable with an extension 46a of a running plate 46. This running plate 46 starts to run when a camera release is actuated, and actuates an automatic focus adjusting mechanism and a shutter mechanism (both of which are not shown) to operate. When the running plate 46 is moved by the charge lever 25 against the bias force of a spring 47, the aforesaid automatic focus adjusting mechanism and the shutter mechanism are made ready to shoot.

Next, a winding stop lever 21 is pivotally supported on a shaft 18 and urged by a spring 23 in a counterclockwise direction. Formed in this winding stop lever 21 are a projected portion 21a for engagement with a cutout portion 27a of the winding stop cam 27, and another projected portion 21b for actuating the aforesaid switch 22 to turn on and off. Also this winding stop lever 21 contacts at its side edge 21c with one end 46b of the running plate 46 when the running plate 46 reaches the terminal end of movement thereof, or when the exposure operation is terminated, and then is turned in a clockwise direction. A swinging lever 32 is pivotally mounted on a shaft 29 on which the gear 28 is rotatably supported, and is urged by a spring 52 in a counterclockwise direction and supports a gear 30 which meshes with the gear 28 rotatably through a shaft 31. A gear 33 is arranged upon setting of the camera in the rewinding mode to engage with the gear 30, and motion of the gear 33 is transmitted through gears 34, 35 and 36 to drive a fork 37 for engagement with a takeup spool in a cartridge to rotate. An actuator plate 38 is slidably supported on pins 39 through respective slots 38a and is urged by a spring 51 to the left as viewed in the drawing. Also formed in the actuator plate 38 are a projected portion 38b for engagement with an end portion 12a of the swinging lever 12, and another projected portion 38c for engagement with an end portion 32a of the swinging lever 32. By its movement, the positions of the gear 9 and the gear 30 are shifted. A rewind control plate 43 has slots 43a through which respective pins 44 extend so that it is slidable to direction C by a control knob 45 and arranged so that its end portion 43c is engageable with a side edge 21c of the wind stop lever 21. Again, in this control plate 43, a projected portion 43b for fixing the control knob 45 thereto. Also, a transmission lever 40 transmits movement of the control plate 43 to the actuator plate 38. This transmission lever 40 is pivotally mounted on a shaft 40c with its slot 40a engaging a pin 41 planted on the actuator plate 38, and a slot 30b engaging a pin 42 supported on the control plate 43. Therefore, it results that the actuator plate 38 is moved in the direction reversed to that in which the control plate 43 moves.

Also, an engagement member or bar 55 is movable downwardly as viewed in the drawing (in a direction of arrow) in response to pushing down of a release button (not shown) on the camera housing. This engagement member 55 is positioned so that when it is moved from the illustrated position in the direction of the arrow, its side surface is in an engaging state with the end portion 38d of the actuator plate 38, and when the actuator plate 38 is moved from the illustrated position to the right, or when the camera is set in the rewind mode, its bottom surface is in an engaging state with a side surface 38e of the actuator plate 38.

It is to be noted that the gears 3, 5, 7, 9, 10, 13, 14, 17, 28, 30, and 33 to 36 are all spur gears.

Next, an explanation is given to the operation of the device of such construction, first regarding the wind-up mode.

FIG. 5 illustrates the wound-up position. Then, when the release button (not shown) is actuated, the running plate 46 starts to move. As the running plate 46 is moving stepwise, the automatic focusing mechanism and the shutter mechanism (not shown) are successively actuated to operate. At the termination of the exposure operation, the left hand end 46b of the running plate 46 strikes the wind stop lever 21 at its side edge and then turns the latter in the clockwise direction under the action of the drive spring 47. Accordingly, the lug 21a of wind stop lever 21 is disengaged from the notch 27a of wind stop cam 27 to render the gear 17 rotatable in the clockwise direction (direction of arrow), and the extension 21b acts to close the switch 22. Thus, the motor 1 starts to rotate. Since, at this time, the gear 17 meshes with the gear 10, motion of motor 1 is transmitted through the gears 5, 7, 9 and 10 to rotate the gear 17 in the clockwise direction (direction of arrow) and, further, through the rotary shaft 16 to rotate the gear 13 in the direction of arrow which in turn causes the spool 2 and sprocket 15 to rotate in a direction to wind up the film 53. Clockwise movement of the gear 17 is also transmitted through the one-way clutch 19 to the rotary shaft 20 along with the charge cam 24 and wind stop cam 27. The charge lever 25 thus is driven to move against the bias force of the spring 49, while returning the running plate 46 to the initial position. This causes the automatic focusing mechanism and the shutter mechanism to be made again ready for the next shooting. By the way, the returning movement of the running plate 46 results in leaving the wind stop lever 21 released from the locking engagement with the end 46b of the running plate 46. Since, at this time, the notch 27a of the wind stop cam 27 is out of alignment with the wind stop lever lug 21a, the wind stop lever 21 is retained in the position where its extension 21b closes the switch 22. Therefore, the motor 1 continues rotating after the running plate 46 has returned to the initial position, until the wind stop cam 27 rotates one revolution so that the notch 27 receives the lug 21a of the stop lever 21. Also, since the sprocket 15 advances the film 53 one frame for every one revolution of the wind stop cam 27, it is at this time that the film 53 is made ready for the next exposure. It is also to be noted in connection with this cycle of camera operation that the bar 55 has been moved in the direction of arrow in response to actuation of a camera release, assuming the position where its side surface is in engagement with the right hand end 38d of the actuator plate 38, wherein the actuator plate 38 is hindered from rightward movement. Therefore, there is no possibility of occurrence of an accidental movement of the actuator plate 38 together with the control plate 43 during the camera operation. Thus, it is assured that the film 53 does not turn back.

As the film 53 is being wound up, the fork 37 is driven to rotate in the direction of arrow. But in this mode, the gear 30 is taken out of engagement with the gear 33, so that the winding operation does not suffer from any overload.

The rewinding operation is as follows: When the control knob 45 is moved from the position of FIG. 5 in the direction of arrow C, and the control plate 43 is set in the position of FIG. 6, the end 43c of the plate 43 pushes the wind stop lever 21 at its side edge 21c and holds the wind stop lever 21 in the position where the extension 21b closes the switch 22. Thereby, the motor 1 is supplied with current. On the other hand, such movement of the control plate 43 is transmitted through the lever 40 to the actuator plate 38 too. Therefore, the actuator plate 38 is moved to the right as viewed in the drawings against the bias force of the spring 51. This results in that the upper side edge 38e is in blocking engagement with the bottom surface of the bar 55, so as to hinder the release button (not shown) from being moved downwards, and that the swinging levers 12 and 32 are turned about their respective pivot pins 8 and 29 in the counterclockwise direction. Accordingly, the gears 10 and 30 are replaced to the directions of transmission of the driving torque (the direction perpendicular to the axis of rotation of the gear (10, 30)). It is to be noted in this connection that the swinging lever 12 turns against the bias force of the spring 50 until the gear 10 is disengaged from the gear 17, and that the swinging lever 32 turns under the action of the bias spring 52 until the gear 30 engages the gear 33. Therefore, motion of the motor 1 is transmitted through the gears 5, 7, 28, 30, 33, 34, 35 and 36 to the fork 37 and, further, to a supply spool (not shown) in the film cartridge. It is to be also noted that during this time the spool 2 and sprocket 15 are rotated in the direction of arrow causing the rotary shaft 16 to rotate in the counterclockwise direction. But this rotative motion is not transmitted to the second rotary shaft 20 because of the action of the one-way clutch 19. Therefore, the charge cam 24 and wind stop cam 27 remain standstill. Thus, there is no possibility of occurrence of a charging operation of the running plate 46, for example.

By the way, during the rewinding operation of the film 53, the bias forces of the springs 50 and 51 act on the swinging lever 32 in a direction to disengage the gear 30 from the gear 33 through the actuator plate 38. But, in this case, the operating pressure of the gear 30 on the gear 33 is combined with the bias force of the spring 52, giving a resultant force which overcomes the combined force of the aforesaid springs 50 and 51. Therefore, the gears 30 and 33 maintain themselves in the meshing state with each other, until the film leader moves away from the takeup spool 2. This situation should be explained in more detail below by reference to FIGS. 7 and 8 which show a base circle 28' of the gear 28; a base circle 30' of the gear 30; and a base circle 33' of the gear 33. The directions of rotation of these gears are indicated at I, J and K. It is noted that the gear 28 receives the driving torque of the motor 1, and the gear 30 is supported on the swinging lever 32 so as to move as a planetary gear around the gear 28, as has been stated above. By the way, as the direction of rotation of the driver gear 28 which is operatively connected to the motor 1 is oriented to I, the driven gear 30 reacts with a force to a direction L in the pressure line of the gears 28 and 30 in mesh. This reacting force is represented by a vector R with its origin at the center of rotation of the gear 30. Also here upon consideration of the force necessary for the fork 37 to take up the film 53 due to the film 53 being convoluted on the spool 2, the frictional forces resulting from the spool 2 fitted to the camera housing, the meshing engagement of the gears 3 and 13 with each other, the fitting engagement of the sprocket 15 in the mounting therefor, the pressing contact of the film 53 against the film gate, etc., these sum up to a large load on the fork 37. On the other hand, the gear 33 serves as a driven gear in relation to the gear 30 when the tooth 33a comes to contact with the tooth 30a. Responsive to application of such load on the fork 37, the gear 33 works to rotate the gear 30 backwards. Therefore, the gear 30 reacts with a force in the direction 0 in the pressure line therebetween as a counter balance to the aforesaid load. This is represented by a vector Q with its origin at the center of rotation of the gear 30. And this reacting force Q increases with increase in the load on the fork 37. Therefore, so long as the film 53 is still connected to the takeup spool 2, the vectors R and Q are added to yield a vector S of such direction as to bring the gear 30 into meshing engagement with the gear 33 at the center Y of rotation of the gear 30. For this reason, that component of the combined force of the vector S and the bias force of the spring 52 which contributes to turn the swinging lever 32 in the counterclockwise direction, is preadjusted to a larger value than that of the combined force of the springs 50 and 51 which contributes to turn the swinging lever 32 in the clockwise direction. Thus, the gears 30 and 33 are maintained in mesh with each other during the rewinding operation of the film 53.

Figure 7:
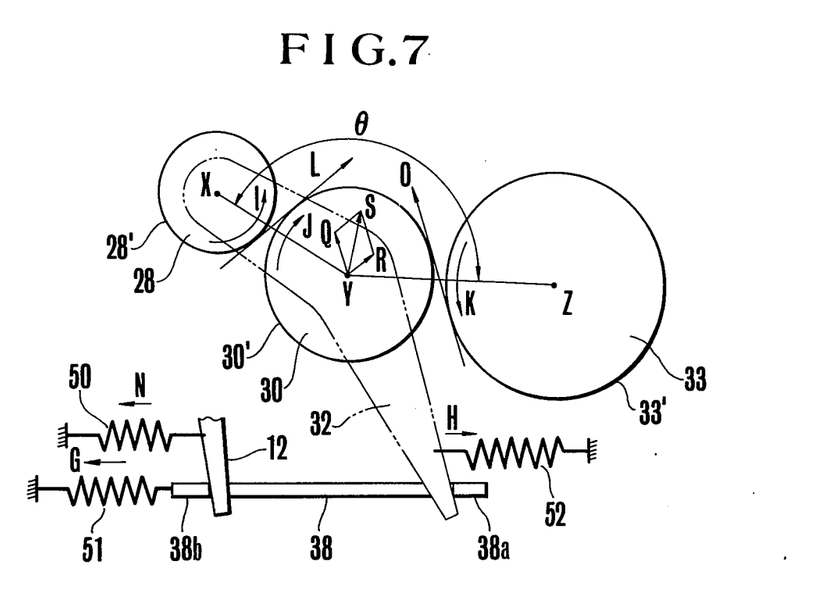
FIG. 7 is a plan view for explanation of the meshing force of the gears in the present embodiment.
Figure 8:
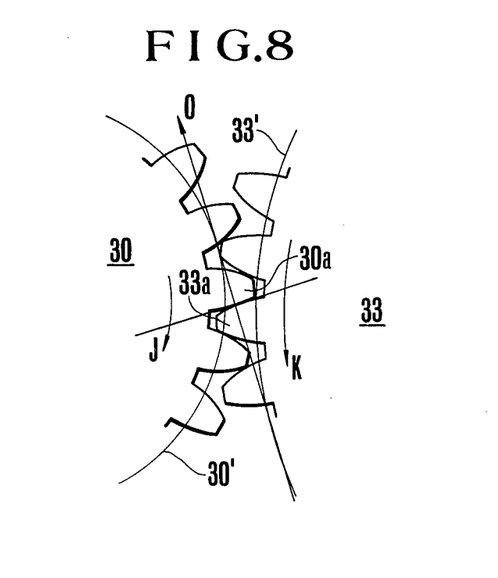
FIG. 8 is a fragmentary plan view illustrating the meshing condition of the gears in the present embodiment.

When the film 53 moves away from the spool 2, the load on the fork 37 is suddenly reduced to a very small value, and, therefore, the reacting force Q almost disappears, permitting the swinging lever 32 to turn in the clockwise direction under the action of the combined force of the springs 50 and 51. Thus, the gear 30 is taken out of engagement with the gear 33 automatically. It should be pointed out in connection with the design of this mechanism that it is of great importance to specify the arrangement of the gears 28, 30 and 33, as the line passing through the centers X and Y of rotation of the gears 28 and 30 makes a considerably obtuse angle $\theta$ with the line passing through the centers of rotation Y and Z of the gears 30 and 33. Or otherwise the combined reacting force S could not act in a direction to bring the gear 30 into engagement with the gear 33. Also, if $\theta = 180°$, the gear 30 is caused by the force S to go round the gear 28 as a planetary gear does and its engagement with the gear 33 cannot be maintained. In this embodiment this angle $\theta$ is taken at about 150°. It is, however, found by the applicant that this angle $\theta$ may range from about 120° to about 170° to effect an equivalent result to the above.

Figure 6:
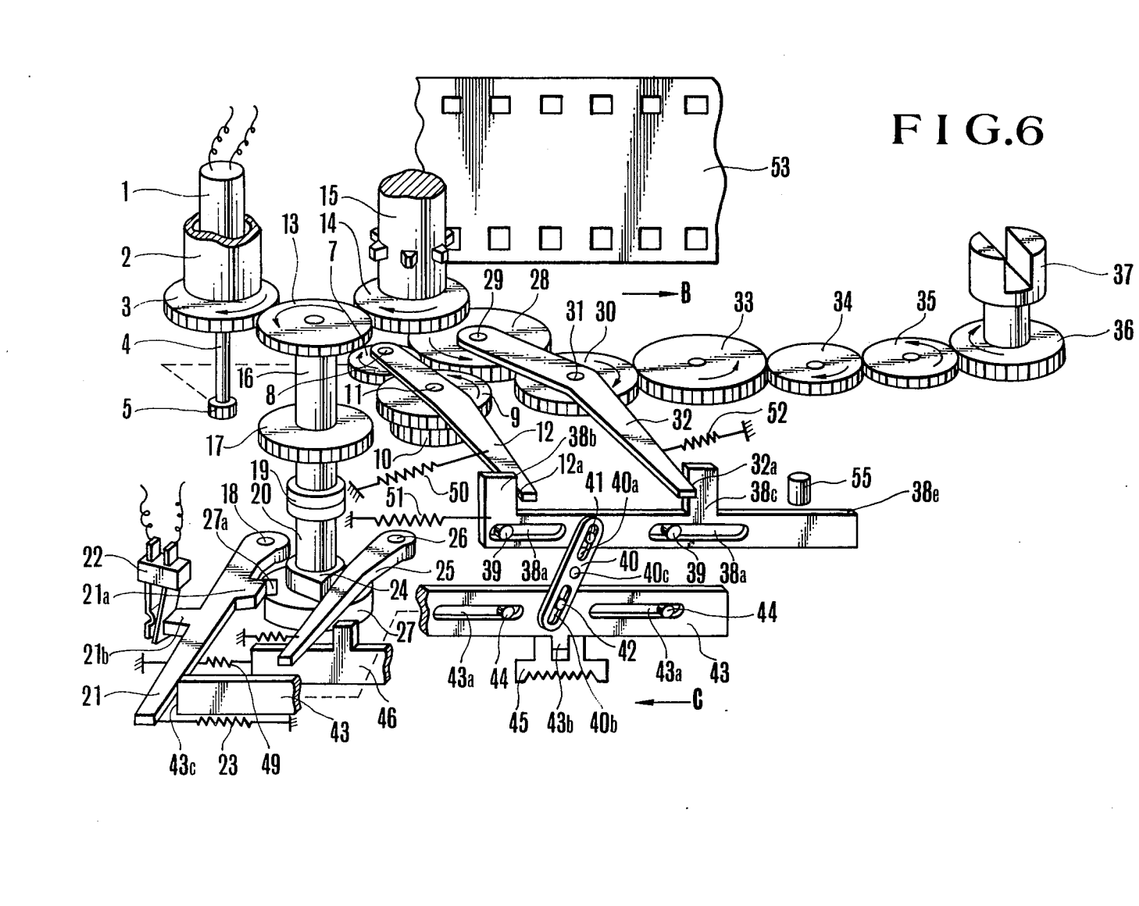
FIG. 6 is similar view to FIG. 5 except that a rewinding position of the invention is illustrated.

Turning now to FIG. 6, when the film 53 is taken out of connection to the spool 2, and the load on the fork 37 is reduced, the actuator plate 38 moves from the position of FIG. 6 to the left under the action of the bias force of the spring 51. Accordingly, the upper side edge of the actuator plate 38 is retracted from the path of movement of the bar 55 so that a shutter release becomes possible, and the control plate 43 is moved through the transmission lever 40 to the right as viewed in the drawing, so that the wind stop lever 21 is no longer blocked by the end 43c of the control plate 43. Then, the wind stop lever 21 turns to the position where the lug 21a is received in the cutout 27a of the wind stop cam 27, wherein the switch 22 is opened to cut off the current supply to the motor 1. Thus, the rewinding operation is terminated. Also since, at this time, the swinging levers 12 and 32 also turn in the clockwise direction as viewed in FIG. 6, the gear 30 is disengaged from the gear 33 and the gear 10 engages the gear 17 again.

If the cutout 27a of the wind stop cam 27 is not in alignment with the lug 21a of the wind stop lever 21, the switch 22 continues being closed even after the control plate 43 has moved to the right as viewed in the drawing. Therefore, even after the film 53 has left the spool 2, the motor 1 is energized so that the wind stop cam 27 is rotated through the gears 10 and 17. Then, when the cutout 27a receives the lug 21a, motion of the motor 1 stops.

Though the foregoing embodiment has been described in connection with the so-called sprocket drive winding up method in which the film 53 is fed into the takeup chamber by the sprocket 15, it is of course possible to apply the principles of the present invention to the so-called spool drive type cameras in which the spool 2 pulls the film 53, while the sprocket 15 functions to index the film 53 and to charge alone.

As has been described above in detail, the present invention provides an arrangement of a driving gear which is operatively connected to a motor, with its center of rotation swingingly movable in parallel to the direction of transmission of the driving torque so that when switched to the film rewinding mode, the driving gear comes into and is maintained in meshing engagement with the driven gear constituting part of a film rewinding system by a load placed on the film rewinding system as the film is being rewound. Such arrangement gives advantages that the rewinding of the film can be automatically stopped without the necessity of using means which have a bad influence on the flatness of the film, and that the aforesaid result can be effected without using special gears such as helical gears. That is, according to the present invention, despite a very simple structure and the limitation of the bulk and size of the camera to a minimum, automatic stoppage of rewinding of film can be achieved and such device is made amenable to low unit production cost techniques.

Also, according to the present invention, it is possible to thoroughly eliminate such accidents that an unintentional touch on the release button at a time during the rewinding operation causes re-exposure of the film, and that when a camera release is actuated, actuation of a rewind release simultaneously occurs with the result that a blurred image is formed on the film.

What I claim:

1. A camera including:
   (a) an electric motor for transmitting a driving torque;
   (b) rewinding means for rewinding a film;
   (c) a first gear arranged to rotate in response to the driving torque transmitted from said motor;
   (d) a second gear arranged for engagement with said first gear to transmit the driving torque of said motor to said rewinding means;
   (e) supporting means for supporting said first gear, said supporting means holding said first gear in a position for meshing engagement with said second gear when rewinding the film until the rewinding of the film is completed;
   (f) changeover means for bringing said first and said second gears into meshing engagement with each other in response to switching of the camera from a winding mode to a rewinding mode; and
   (g) means movable in response to actuation of a shutter button on the camera for hindering said changeover means from being actuated so long as the shutter button is under operation, and for hindering the shutter button from being actuated when said changeover means is in the rewinding position.

2. A camera according to claim 1, wherein said changeover means is arranged to be urged in a direction to take said first and said second gears out of engagement with each other.

3. A camera according to claim 2, wherein when the film is being rewound, said changeover means is held in the rewinding position by engaging with said supporting means.

4. A camera comprising:
   (A) an electric motor;
   (B) rewinding means for rewinding a film;

(C) a first gear for transmitting a driving torque of said motor to said rewinding means;

(D) a second gear including a rotary shaft arranged to rotate in response to transmission of the driving torque of said motor thereto;

(E) swinging means movably supporting on said rotary shaft of said second gear;

(F) a third gear rotatably supported on said swinging means and meshing with said second gear, said third gear being arranged upon swinging movement of said swinging means to be engageable with said first gear and upon meshing engagement with said first gear to exert a reactive force by which that meshing engagement is retained, said reactive force taking a first value when the film is being rewound by said rewinding means, and taking a second value weaker than the first value when the rewinding of the film by said rewinding means is completed; and (G) first bias means urging said swinging means in a direction to take said third and said first gears out of meshing engagement, the working force of said bias means having a value weaker than the first value of said reactive force and stronger than the second value of said reactive force.

5. A camera according to claim 4 wherein said swinging means moves said third gear swingingly in a direction almost perpendicular to an axis of rotation of said third gear.

6. A camera according to claim 5 wherein when said third gear and said first gear are in mesh, the angle which a line passing through the center of rotation of said first gear and the center of rotation of said third gear makes with a line passing through the center of rotation of said second gear and the center of rotation of said third gear lies in a range of from about 120° to about 170°.

7. A camera according to claim 4 further including means for winding up the film, and wherein when said third gear is released from the meshing connection with said first gear, the driving torque of said motor is transmitted to said winding means.

8. A camera according to claim 7 wherein said third gear is arranged to come into meshing engagement with said first gear in response to switching of the camera from a winding mode to a rewinding mode.

9. A camera according to claim 4 further including second bias means uring said swinging means in a direction to bring said third gear into engagement with said first gear, the working ofrce of said second bias means being made weaker than that of said first bias means.

10. A camera according to claim 4 wherein said first bias means is arranged to apply its bias force on said swinging means at a farther position from the center of swinging motion of said swinging means than the center of rotation of said third gear.

11. A camera including:

(a) an electric motor for transmitting a driving torque;

(b) rewinding means for rewinding a film;

(c) a first gear arranged to rotate in response to the driving torque transmitted from said motor;

(d) a second gear arranged for engagement with said first gear to transmit the driving torque of said motor to said rewinding means;

(e) swinging means for supporting said first gear and arranged to be swingingly movable about a pivot axis in a different position than that of the axis of rotation of said first gear, said swinging means permitting said first gear to be held in a position for engagement with said second gear in response to an operating force exerted between said first and second gears as the film is being rewound by said rewinding means until the rewinding of the film is completed; and (f) limiting means arranged upon abutting engagement with said swinging means to limit to a prescribed position the position at which meshing of said first and said second gears takes place.

* * * * *